United States Patent [19]
Pierrou

[11] 3,975,277
[45] Aug. 17, 1976

[54] LIQUID COMPOSITION FOR THE TREATMENT OF WASTE MATERIALS

[75] Inventor: Rune Helmer Pierrou, Falun, Sweden

[73] Assignee: Nitro-Nobel A.B., Gyttorp, Sweden

[22] Filed: Apr. 10, 1975

[21] Appl. No.: 566,800

Related U.S. Application Data

[63] Continuation of Ser. No. 347,842, April 4, 1973, abandoned.

[52] U.S. Cl. ................................ 252/2; 106/15 FP; 106/73; 106/83; 106/84; 260/29.6 R; 260/29.6 M; 260/29.6 S; 260/29.6 RB; 260/42.55; 252/8.1
[51] Int. Cl.² .................................... A62D 1/00
[58] Field of Search .............. 260/29.6 R, 29.6 M, 260/29.6 S, 29.6 RB; 252/2, 8.1; 161/403; 106/15 FP, 90, 97, 99, 103, 73, 83, 84

[56] References Cited
UNITED STATES PATENTS
3,226,318 12/1965 Schick .................................. 210/10
3,519,580 7/1970 Schou .................................. 260/17.2

*Primary Examiner*—Benjamin R. Padgett
*Assistant Examiner*—E. Suzanne Parr
*Attorney, Agent, or Firm*—Hane, Baxley & Spiecens

[57] ABSTRACT

A liquid composition comprising an emulsion of a vinyl plastic, an alkali acetate, an aluminum compound such as the fluoride, water glass, an alkali sulfate and an alkali thiosulfate is useful as a fire retarding agent for treating waste. Perchloric acid or alum may be added to the composition or may replace the alkali sulfate and alkali thiosulfate. If desired, kaolin and/or crushed pumice slag may also be added.

6 Claims, 1 Drawing Figure

Figure 1:
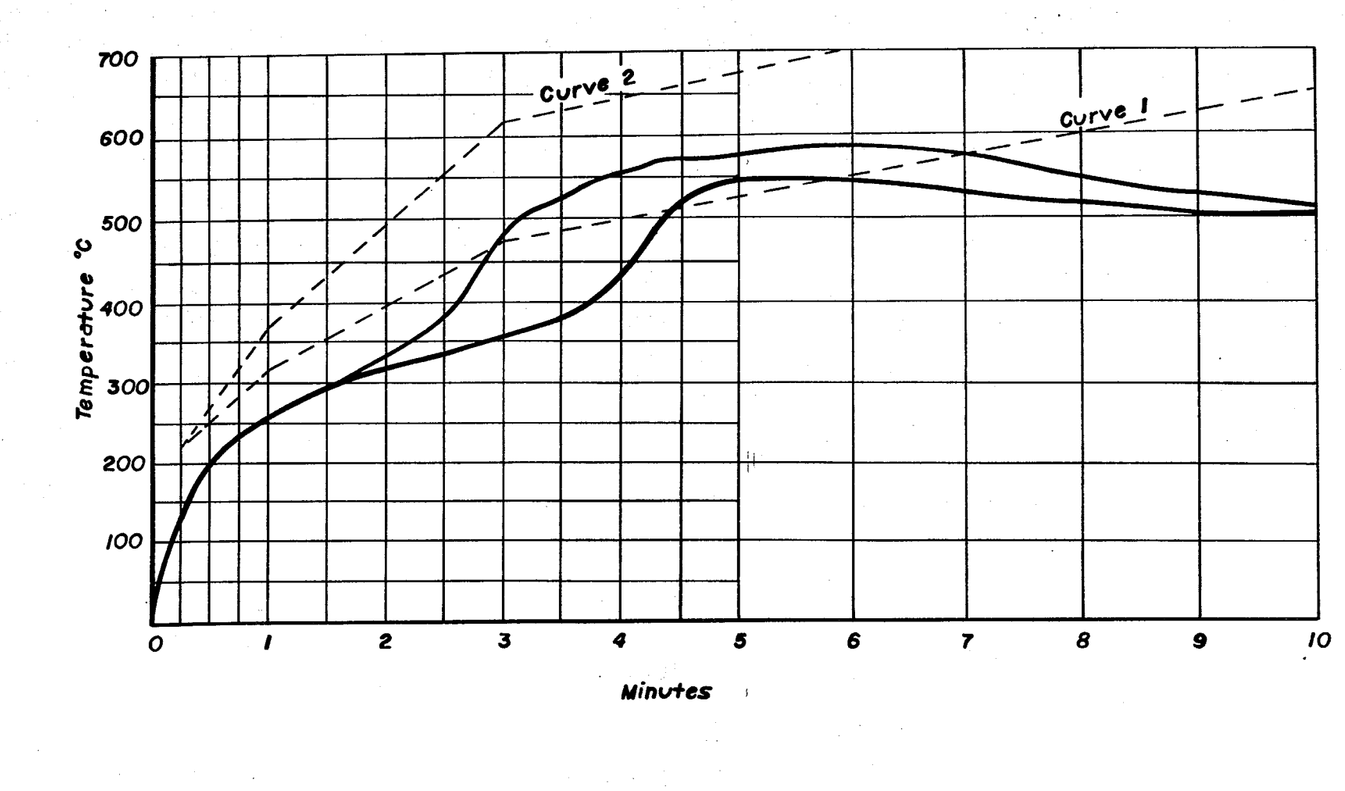

LIQUID COMPOSITION FOR THE TREATMENT OF WASTE MATERIALS

This is a continuation of application Ser. No. 347,842, filed Apr. 4, 1973, now abandoned.

The present invention relates to a liquid composition, which can be used as fire-retarding and fire extinguishing agent. More-over the present composition can be used for making waste material economically useful, such as solid garbage, sediment from pulp and paper mills and bark from timber-cutting, saw mills and pulp mills and different types of calciferous mineral materials with its wastes and/or ashes. Thus, by the present invention waste products can be utilized and converted to technically valuable products, for instance useful as substitute for gravel and stone as ballast in concrete casting and road filling.

Thus, with the liquid composition of the present invention it is possible to produce clinker, so-called lightweight concrete clinker, from different calciferous mineral materials with its wastes and/or ashes and from solid garbage. The clinker obtained is heat- and sound-absorbing and shows low water absorption. There is no risk of corrosion. The clinker can for instance be used as ballast material in building units, such as beam constructions of concrete, so-called lightweight ballast concrete, and for sorption of oil, for instance from oil polluted water. Porous materials treated with the present composition, for instance pumice and expanded clay, can also be combined with a suitable plastic material, such as polyester, for the preparation of for instance facing plates.

Here and in the following it is meant by calciferous mineral materials for instance limestone splinters, slates with belonging wastes and/or ashes, such as slate ashes, mineral materials, for instance pegmatite, carnotite or equivalent materials and wastes and/or ashes thereof, such as nuclear fuel ashes, porous mineral materials, for instance pumice or the like, slag from ironworks inclusive of pumiced and granulated slag.

The present liquid composition consists of a mixture of a plastic emulsion, preferably on vinyl plastic base, an alkali metal acetate, an aluminum compound, water glass, the weight ratio $SiO_2:Na_2O$ varying within the range 0.8 – 7.5, water, and alkali metal sulfate and alkali metal thiosulfate and/or perchloric acid or alum, preferably perchloric acid. The liquid composition of the invention can also contain an addition of kaolin or crushed pumiced slag fines.

Hereinafter it is intended that alkali metal will include ammonium.

By plastic emulsion is meant for instance polyvinyl acetate, polyvinyl acrylate, polyvinyl chloride, polystyrene or the like or copolymers thereof.

Aluminum compounds to be used in the present liquid composition comprise for instance aluminum fluoride, aluminum fluorosilicate, alum and similar compounds generating alum.

None of the included components has any apparent effect per se desired here for the liquid composition except for water glass. The plastic emulsion has a good binding effect, and the surface treated with the emulsion can be painted. The aluminum compound seems to have a wetting effect and facilitates penetration in the treated material, the acetate contributing in dissolving the aluminum compound in the liquid mixture. The thiosulfate seems to act softening, as the surface obtained at the treatment with the present liquid composition becomes harder and cracks, if the thiosulfate is omitted. The kaolin gives in its turn rise to a heat shield, which is tenacious and effective in the fire retarding agent, and creates a surface layer on a material treated with it.

A preferred embodiment of the present liquid composition consists of polyvinyl acrylate, sodium acetate, aluminum fluoride, water glass, perchloric acid and water. It is especially suitable for the treatment of different types of calciferous mineral materials with belonging wastes and/or ashes for the preparation of lightweight ballast clinker.

Another preferred embodiment of the liquid composition according to the present invention consists of a mixture of a copolymer dispersion of styrene and acrylate, Glauber's salt, sodium acetate, aluminum fluoride, sodium thiosulfate, water glass and water. It can be used for the preparation of lightweight ballast clinker and is especially used for the treatment of bark and sediment from the cellulose industry and solid garbage for the preparation of a material, which can for instance replace gravel as road filling material. Optional addition of kaolin makes the liquid especially suitable as fire retarding and fire extinguishing liquid. In the latter case the kaolin can also be replaced with crushed pumiced slag fines.

The present liquid composition can for instance be prepared from main mixtures made as follows.
1. 1 part by volume of plastic emulsion is mixed with 0–10 parts by volume of water.
2. 0.5–3 parts by weight of alkali metal sulfate are dissolved in 1 to 10 parts by volume of water.
3. 1 part by weight of alkali metal acetate is dissolved in 4–20 parts by volume of water.
4. 0.25 parts by weight of an aluminum compound are dissolved in 10–40 parts by volume of water.
5. 0.5–3 parts by weight of alkali metal thiosulfate are dissolved in 1–10 parts by volume of water.
6. water glass 38–42 Be, preferably 40–42 Be.

The solutions 2–5 can also have such a high concentration that they are saturated, if desired supersaturated. Of these main mixtures the following is mixed in the order listed for preparation of the fire retarding liquid:

|  |  |
|---|---|
| 1 | part by volume of mixture 1) |
| 1 | part by volume of mixture 2) |
| 0.5–1 | part by volume of mixture 3) |
| 0.5–1 | part by volume of mixture 4) |
| 0.5–1 | part by volume of mixture 5) |
| 3–5 | parts by volume of mixture 6) |
| Totally 6.5–10 | parts by volume |

Mixing in another order provides a viscous mixture or flocculation, which is counteracted by starting with the aqueous phase. If desired 0–10 parts by volume of kaolin are then added, which is finely pulverized, if the liquid is to be sprayed, otherwise also coarser, for instance China clay of different pH-values, on 10 parts by volume of liquid or crushed pumiced slag fines in an amount of 0–10 parts by volume of crushed pumiced slag fines on 10 parts by volume of liquid.

If the liquid is to be used for the preparation of lightweight ballast clinker, the alkali metal sulfate and thiosulfate can be replaced with perchloric acid of 6–60 percent or alum in saturated solution. In this case the liquid should be mixed before the perchloric acid is added, for instance in an amount of 1 part by volume on 50 parts by volume of liquid.

At present the ironworks get slag either in granulated or pumiced form, the latter product, which is also called foamed slag, consisting of porous, lightweight slag lumps, which have a consistency similar to pumicestone. The granulated slag is obtained in such manner that water is poured on the running slag for rapid cooling, which results in grains similar to sand, preferably in the fraction of 0–4 mm. The pumiced slag is, on the other hand, cooled with a small quantity of water so that the slag will run directly from the ironworks into a flute with a water screen, the slag being foamed due to gas development of hydrogen sulphide and hydrogen.

As the application field for pumiced slag has so far been very limited and, moreover, the volume of the granulated slag becomes about 20 % of that of the pumiced slag, the slag is usually granulated by the ironworks. Not much of this slag product can be sold. Therefore great quantities of slag are a surplus product. About 300 kg slag per ton pig iron are obtained. The bulk density of granulated slag is for instance 1000–1700 kg/m$^3$, whereas the highly pumiced slag has a bulk density of 100–400 kg/m$^3$. Moreover, the bulk density is dependent on the type of iron prepared and can be within the range of 100–950 kg/m$^3$.

The pumiced slag consists of pieces of up to 0.1 m$^3$ and can easily be crushed, one third of each of the following fractions being obtained: 0–5, 5–10 and 10–20 mm (highly porous slag) or 0–4, 4–8 and 8–16 mm (less porous slag).

Recently the possibilities of using some lightweight materials as a substitute for gravel and stone in concrete have been investigated. This type of concrete, so-called lightweight ballast concrete, is at present not used very much in Sweden, but recently the interest in this concrete has increased due to several factors, for instance due to a future lack of and increased care of gravel and sand supplies, demand for lighter material in industrialized building and the necessity of using grounds with reduced carrying capacity for building purposes. The reason for the modest use of lightweight ballast concrete at present is found in primarily three factors, i.e. the comparatively high price, lack of lightweight ballast types having a high strength and insufficient data and directions of use.

However, from a general point of view in respect of nature conservancy there is no doubt an advantage if waste slate and wastes from the iron industry, from limestone quarries etc. can be utilized as raw material for the production of e.g. construction material and must be preferred in comparison with using the gravel supplies or the solid rocks of the country.

Several and comprehensive tests with sintered ashes, sintered clays and perhaps most with expanded clays have been made in the course of years to find a substitute material for gravel in concrete. Slags from ironworks have also been investigated, both granulated and pumiced ones. Slag materials from ironworks are the most interesting ones of those indicated, but they have the disadvantage that sulphuric acid arises in mixture with water. As the sulphuric acid attacks armouring, the slag is unsuitable for construction concrete. The highly porous, pumiced slag is furthermore too brittle to be used in preparation of concrete. It is difficult to handle when it is wet. This applies during crushing and sieving as well as casting. Thus it is unsuitable to use untreated, highly porous, pumiced slag as ballast in concrete due to too great size reduction in conventional mixers and due to the risk of formation of the so-called Kc-mortar by the combined action of cement and the calcium oxide present in the slag, which reduces the strength of the concrete element.

Now it has been found that even a highly porous, pumiced, dry slag can be treated with the liquid composition of the present invention, the slag grains being coated with hard crusts with a low water absorption. The slag grains are encased so that attacks of sulphuric acid on armouring are avoided and the hardness of the slag grains is increased. The grains will become stronger the more liquid that is used. They are optionally strengthened by the addition of cement. The latter applies especially to the lightest, most "foamed" pumiced slag. A ballast product is then obtained called slag clinker, which is fully equal to other known ballast materials according to tests of compression strength, bulk density and water absorption, and can be used in the preparation of concrete. A concrete is obtained similar to aggregate concrete but much lighter than the latter. It is decidedly better than aerated concrete and expanded clay concrete.

If the untreated, highly porously pumiced slag is immersed in water, it will for instance absorb in 24 hours 135 per cent by weight of water and in 7 days 200 per cent by weight. The treated pumiced slag has after 24 hours absorbed 13 per cent by weight of water and after 7 days 17 per cent by weight. The bulk density of untreated, highly porous, pumiced slag amounts for instance to 121 kg/m$^3$ (loosely packed), whereas the treated pumiced slag has for instance a bulk density of 132–140 kg/m$^3$.

The composition of the pumiced slag depends on which kind of iron is prepared, and the porosity depends on how the gases are developed during the pumicing. Thus the different, pumiced slags obtain different loosely packed bulk densities. The less porous ones become heavier but stronger. As this is the case the lightest, most brittle, pumiced slag of the loosely packed bulk density 120–300 kg/m$^3$ and the bulk density 150 kg/m$^3$ has been investigated in respect of compression strength, bulk density and water absorption. The other calciferous materials, such as pumiced slags of loosely packed volume weights in excess of 300 kg/m$^3$, splinters, ashes etc. show even without strengthening with cement of the layer on the grains obtained with the present liquid better results in tests for construction concrete of lightweight ballast.

A ballast material prepared by means of the present liquid composition, which material has lower inherent strength than that required for use as construction concrete, for instance prepared from slag with a loosely packed bulk density of less than 300 kg/m$^3$, can be used for insulating functions and/or in certain concrete materials and should be included in lightweight ballast insulating concrete. Thus, by a suitable combination of slag properties and composition and thickness of the crust, a strong ballast for construction purposes can be prepared, i.e. a light-weight ballast concrete satisfying the demands on construction concrete according to the Regulations for concrete. A homogeneous, impermeable concrete is for instance prepared by admixing slag grains of the finest fraction (filler) together with slag grains of coarser fractions, the voids between the grains in the concrete element being filled.

The slag clinker can be additionally improved by treating it with an asphalt solution. After coating with asphalt the particles will not absorb any water. Such slag clinker is very suitable for heatinsulating of causeways.

In preparation of clinker using the liquid composition of the present invention the mineral material is crushed to fractions according to the standard sieve curve and is mixed with a liquid mixture according to the invention, a granular material being obtained, in which the grains are surrounded by a crust. These have varying strength depending on the choice of waste material. For obtaining the desired strength a cement powder is then if necessary added and mixing is continued, after which the grains are tumbled and dried at 50–90°C, suitable at 70°–90°C, preferably at 80°–85°C, for 10–25 min., preferably 15 min. The strong crust obtained and surrounding the grain improves the strength of the grain, protects it from surrounding conditions and provides a better adhesion at a possible following casting. This material is ready for use or storage and can for instance be mixed with cement for different purposes of use. The different, well-defined fractions of the crushed mineral material are mixed before the addition of liquid or are treated individually. The bigger grains alone give a more high-void concrete, insulating concrete.

Clinker prepared as above from the more solid waste materials without the possible addition of cement, has substantially the same water absorption and strength as clinker prepared from the more porous materials with addition of cement.

5–15 parts by volume of the present liquid composition and if desired 5–15 parts by weight, preferably 7–10 parts by weight of cement are used for 100 parts by volume of mineral material. The ratio liquid mixture: cement is preferably 1:1 parts by volume/parts by weight. A bigger addition of the liquid composition facilitates a bigger addition of cement. The more liquid and the more cement used, the thicker and stronger but simultaneously heavier crust is obtained.

The clinker obtained according to the indicated method can all according to the Regulations for concrete be mixed with for instance 100–600 kg cement per m$^3$ admixed clinker (loosely packed volume) for the preparation of construction material. Clinker of pumiced slag treated according to the indicated method provides a ballast material absorbing 17, 13 and 10 per cent by weight of water at the fractions 0–4, 4–8 and 8–16 mm. The bulk density amounts to about 150–800 kg/m$^3$. At clinker of slate ashes treated according to the indicated method and containing 2 per cent of sulphur, the water absorption was reduced by 100 %.

If cement in the concrete is replaced with polyester, facing plates, which are lighter than conventional facing plates, can be manufactured. These facing plates of plastic-bound slag clinker stand waste gases and salt vapors and are therefore very durable. By the treatment of the slag clinker with the present liquid composition and the curing of the plastic material the plate, and consequently the facade, will be very insensitive to fire. The slag clinker must be brought to red heat, if the plate is to be destroyed.

In the paper mills a sediment is created as residue at screening of the pulp in the step after screening and before the endless wire, which sediment is a waste product and consists of torn wood mixed with kaolin. It contains shivers etc. and lignin remains. The waste of sediment is often burnt, as it has found no use. If this sediment is pressed so that the main part of the water is removed, and then treated with the liquid composition according to the present invention, 5 l liquid generally being used for 100 l sediment, a strengthened and stiffened product with improved (low) water absorption is obtained. Sediment may also be treated with asphalt in the same way as the slag clinker, the asphalt layer additionally preventing water absorption and increasing friction. The low water absorption prevents mouldering.

Bark and solid garbage can also be impregnated in the indicated manner. The advantage of the bark and the garbage treated with the present liquid composition is that in comparison with the untreated one it has a bigger strength, does not absorb water and thus does not decay. Often 5 l liquid for 100 l bark are used. The bark and the garbage may, if desired, be treated with asphalt.

Thus, solid garbage and/or chemical industrial wastes, e.g. sludge, sediment from paper mills and pulp mills and bark from pulp mills, saw mills and timbercutting as well as slag from ironworks can be impregnated with the present liquid composition and asphalt-treated, a water-proof and strong material being obtained, which can for instance be used as road material and replace gravel as ballast in roads. It acts heat-insulating and draining, frost damages being avoided and a rapidly drying, durable surface being obtained in a simple and economically advantageous manner. Moreover it is much lighter than gravel and costs of transports are much reduced, as it can be transported in big containers.

The method so far often used to fill forest roads with untreated bark has the disadvantage that the bark putrefies. By treatment of the bark with the liquid composition of the present invention this putrefaction is avoided simultaneously as the waste materials slag, garbage, bark and sediment are made economically useful. Moreover there is an advantage in respect of nature conservancy that the big destroying heaps of bark in the woods disappear. It is very expensive to destroy the heaps of bark, and therefore it is quite naturally an advantage if they can also be used economically. Furthermore, the interest in saving the gravel ridges has increased more and more.

The liquid composition used is the same for the four waste materials, different concentration being used and establishing the same effect on wooden as well as stone material. Thus it acts hardening, preserving and water-repellent as well as joining. In principle the same machines can be used for the preparation of the different waste products.

Moreover, the present liquid composition can be used as fire-retarding liquid and fire extinguishing liquid. When the present fire-retarding liquid is applied to e.g. wood, particle boards, fibreboards, porous as well as hard ones, they will become highly incombustible. Also paper and fabric are given a certain protection against ignition. Tests show that for instance particle board and board of different qualities, which have been immersed in or painted with the fire retarding liquid of the present invention, cannot burn. They can be burnt but not destroyed by fire. As soon as the flame is removed from the board, the fire will go out immediately. The effect of a heat shield is obtained. The fire-retarding liquid can be sprayed or coated on board already placed on walls or in ceilings. The fire-retarding liquid can also be given such properties that it can be applied to wallpaper at paper-hanging being used as wallpaper paste in usual manner.

Some fibreboards sold are so inflammable that there is a risk that they might be prohibited. For instance some asphalt-impregnated boards are among those. When they are treated with the present fire-retarding liquid, they stand fire. The fire-retarding liquid is per se impregnating, and therefore no asphalt is necessary in this case.

The present liquid composition is especially suitable as fire-retarding liquid for porous board. It is applied to sheets of porous board in the process line immediately after the last pair of rolls before the cutter and the dryer in an amount of for instance 1 l liter/m². The liquid applied to a maximum amount of 1 liter/m² provides a fire protection approved according to British class I and Swedish class 2. Double-faced coating gives a better result. If only one side of the board is coated, flame resistance on one side is obtained. Approved classifying is however received. The enclosed drawing shows the tendency of the surface layer of catching fire all over, determined according to method description Br 4: 1967 of Statens Provningsanstalt on ½ porous board provided with surface pulp, and the drawing shows the temperature of the fumes as a function of time. Limit curve 1 respectively limit curve 2 characterizes a surface layer as flameproof (class I) respectively flameresistant (class II) in accordance with definitions given in Svensk Byggnorm 67, section 37:15. As is evident from the drawing the curves obtained are well below curve 2, in certain cases near curve 1. For penetration of the liquid in a dry board the surface tension is first reduced by spraying with the present liquid without addition of kaolin. It has been found that the aluminum compound here is essential. Then it is sprayed with liquid with addition of kaolin. The addition of kaolin has the effect that the liquid does no longer sink into the wet sheet but that a surface layer is formed. In applying the present liquid to a wet sheet in the process line kaoline-containing liquid can however be sprayed on directly. The fire-retarding liquid can also be applied to hardboard after drying. Also oil-treated board obtain fire retarding properties with the present fire-retarding liquid.

The surface obtained can very well be painted, but it is water-repellent. Painting with aniline dyes is quite possible, whereas some emulsion paints give rise to a dappled surface, which is not merely due to cracking but sooner to the fact that the surface is hydrophobe while the paint is hydrophile. The fire-retarding liquid of the present invention can also be used as paint by replacing the dilute water in marketed acoustic dyes with the liquid composition, and by means of different pigments it can be converted to a primer (covering paint) or provide a coloured surface. Titanium dioxide in a quantity of 10–200 kg/m³ and aniline as a tint colour can for instance be used.

The liquid according to the invention is cheaper than the fire-retarding agents so far known. Moreover, at porous board the surface pulp consisting of expensive ground pulp, can be omitted, as the board is provided with a surface layer of the present fire-retarding liquid giving the same surface. Thus no increase of costs due to the fire-retarding treatment will occur.

Board coated with the present liquid can replace aluminum in funnels on e.g. boats, a sound absorptive effect also being obtained.

After preparation of the indicated main mixtures in the indicated order the fire-retarding liquid of the present invention can be sprayed and applied to the material, preferably by means of a sprayer with agitator, as the kaolin-containing mixture is separated, if not stirred during the application. A solution that has been separated need only be stirred before use. The storage time is about 1.5 years in a closed vessel. There is no risk of corrosion. On the other hand a liquid free of kaolin does not separate.

If the fire-retarding liquid of the invention, optionally without addition of kaolin, is diluted with water in a volume ratio of liquid to water of about 1:30 – 1:1, a fire extinguishing liquid is obtained. After dilution the liquid can be kept in for instance a container under pressure with cartridge release. It should be slightly shaken before use, as it separates during long time storage. In such a state the liquid can be kept from 1.5 to 2 years without being destroyed. During this time the liquid need only be shaken to recover its character. No degradation whatsoever occurs.

When a fire is extinguished by means of the present liquid, re-ignition is eliminated. It is for instance used for extinguishing fire in wood, for instance roof trusses, textile materials, fibre board and the like.

In the fire extinguishing liquid of the present invention the kaolin can be replaced with crushed pumiced slag fines.

The present invention is described more in detail in the following examples:

EXAMPLE 1.

Pumiced slag having a bulk density of 150 kg/m³ is crushed in a crusher with a rolling pin of cast iron to slag grains in the fractions 0–5 mm, 5–10 mm and 10–20 mm.

1 l of polyacrylate is mixed with 9 l of water, after which 3 dl perchloric acid of 6 per cent is added (mixture A). 4 l of water glass (the weight ratio $SiO_2:Na_2O$ is 50:50) are mixed with 11 l of water (mixture B). 5 l of mixture A are mixed with 5 l of mixture B (mixture C). In this case the perchloric acid cannot be added to a mixture of polyacrylate, water glass and water, as such an addition causes flocculation.

100 l (loosely packed) of the individual slag grains of the different fractions are mixed for 1.5 min. in a specially lenient and effective mixer of the type dough mixer with 10 l of mixture C, after which 10 kg cement are added and mixing is continued for 1.5 min. This treatment causes crushing of the slag grains additionally 30 per cent to the fractions 0–4 mm, 4–8 mm and 8–16 mm. Thus slag grains according to the standard sieve curve are obtained.

The treated grains are tumbled and dried in a conventional, slowly rotating, cylindrical drying oven at 80°C for 15 min. The slag grains obtain a solid crust, which gives the grains increased strength.

For investigation of the usefulness as ballast material in concrete castings the prepared grains of slag clinker are mixed with 10 kg cement, based on 100 l slag (loosely packed volume) in a conventional concrete mixer. 6 cubes (15 × 15 × 15 cm) are cast for determination of compression strength, bulk density and water absorption (cube series SO1-3). Table 3 indicates the average values obtained for the 6 cubes.

Cubes of slag clinker of pumiced slag prepared according to the method defined are prepared in the same way containing 200 and 300 kg cement respectively per m³ of crushed slag grains (cube series SK1–Sk3). At SK2 and SK3 the addition of perchloric acid was 2 dl and 1 dl respectively instead of 3 dl as in Sk1. For the sake of comparison test cubes were prepared in analogous manner from clinker of untreated pumiced slag with additions of cement, the so-called K-numbers, of 200, 300, 200 and 300 kg/m³ (cube series SO1, SO2, SO2-2 and SO3 respectively) and cubes of expanded clay with the K-numbers 200, 200 and 300 kg/m³ (cube series LK2, LK2-2 and LK3 respectively). Compression strength, bulk density and water absorption are determined for the cubes.

The results obtained appear from table 3. Tables 1 and 2 indicate more in detail the composition of the cubes.

TABLE 1

A survey of the materials: Sieve curves and volumes.

| cubes No. | Ballast in mm. | Volumes in % | Bulk density in kg/m³ wet | Bulk density in kg/m³ dry | 0.125 | 0.25 | 0.5 | −1 | −2 | −4 | −8 | −16 | No. |
|---|---|---|---|---|---|---|---|---|---|---|---|---|---|
| SO1 | 10–20 | 25.5 | 237 | 211 | | | | | | | | | |
| | 5–10 | 54.5 | 320 | 256 | 0.5 | 1.0 | 4.7 | 4.7 | 7.8 | 8.9 | 19.8 | 100.0 | 3a. |
| | 0–5 | 20.0 | 629 | 498 | | | | | | | | | |
| | 0–20 | | | 413 | 11.6 | 19.0 | 25.4 | 38.9 | 54.0 | 10.0 | 88.4 | 98.4 | 3. |
| SO2 | 10–20 | 20.0 | | | | | | | | | | | |
| | 5–10 | 54.5 | | | | | | | | | | | |
| | 0–5 | 25.5 | | | | | | | | | | | |
| | 0–20 | | | 492 | Analyses and curves, as above. | | | | | | | | |
| SO2-2 | 10–20 | 20.0 | | | | | | | | | | | |
| | 5–10 | 54.5 | | | | | | | | | | | |
| | 0–5 | 25.5 | | | | | | | | | | | |
| | 0–20 | | | 237 | 0.4 | 0.9 | 4.6 | 22.0 | 34.4 | 51.5 | 74.0 | 96.2 | 4. |
| SO3 | 10–20 | 20.0 | 84 | 84 | | | | | | | | | |
| | 5–10 | 54.5 | 123 | 122 | | | | | | | | | |
| | 0–5 | 25.5 | 298 | 274 | | | | | | | | | |
| | 0–20 | | | 243 | Analyses and curves, as above. | | | | | | | | |
| SK1 | 10–20 | 20.0 | | | | | | | | | | | |
| | 5–10 | 54.5 | | | | | | | | | | | |
| | 0–5 | 25.5 | | | | | | | | | | | |
| | 0–20 | | | 492 | 1.9 | 15.6 | 25.9 | 37.1 | 52.4 | 68.3 | 93.5 | 98.7 | 5a. |
| SK2 | 10–20 | 25.0 | | | | | | | | | | | |
| | 5–10 | 50.0 | | | | | | | | | | | |
| | 0–5 | 25.0 | | | | | | | | | | | |
| | 0–20 | | | 231 | 0.3 | 3.8 | 11.7 | 20.5 | 36.2 | 60.3 | 92.5 | 99.5 | 5. |
| SK3 | 10–20 | 25.0 | | | | | | | | | | | |
| | 5–10 | 50.0 | | | | | | | | | | | |
| | 0–5 | 25.0 | | | | | | | | | | | |
| | 0–20 | | | 231 | Analyses and curves, as above. | | | | | | | | |
| LK2 | 10–20 | 20.0 | | 250 | | | | | | | | | |
| | 3–10 | 54.5 | | 350 | | | | | | | | | |
| | 1–3 | 25.5 | | 464 | | | | | | | | | |
| | 1–20 | | | 405 | 4.3 | 8.1 | 11.6 | 17.4 | 32.4 | 53.7 | 87.5 | 94.0 | 6. |
| LK2-2 | 10–20 | 20.0 | | | | | | | | | | | |
| | 3–10 | 54.5 | | | | | | | | | | | |
| | 1–3 | 25.6 | | | | | | | | | | | |
| | 1–20 | | | 414 | Analyses and curves, as above. | | | | | | | | |
| LK3 | 10–20 | 20.0 | | | | | | | | | | | |
| | 3–10 | 54.5 | | | | | | | | | | | |
| | 1–3 | 25.5 | | | | | | | | | | | |
| | 1–20 | | | 395 | Analyses and curves, as above. | | | | | | | | |

Table 2

1 = Total volume, 2 = Mixed volume
3 = Volume of prepared slag clinker,
4 = Volume of cast compound, 5 = Volume of casting.
SURVEY OF PACKING DEGREES, CEMENT NOS. AND BULK DENSITIES

| Cubes No. | Reference No. | Additions Cement (kg) | Additions Water (l) | Water in ballast | Weights by volume in kg/m³ | Volumes |
|---|---|---|---|---|---|---|
| SO1 | 1 | | | | | 100 |
| | 2 | | | 95 | 413 | 70.9 |
| | 4 | 238 | 139 | 162 | 1240 | 41.8 |
| | 5 | 298 | 174 | 203 | 1553 | 33.4 |
| SO2 | 1 | | | | | 100 |
| | 2 | | | 49 | 492 | 70.9 |
| | 4 | 300 | 174 | 83 | 1390 | 41.8 |
| | 5 | 376 | 218 | 103 | 1740 | 33.4 |
| SO2-2 | 1 | | | | | 100 |
| | 2 | | | 16 | 237 | 63 |
| | 4 | 176 | 230 | 24 | 772 | 43.5 |
| | 5 | 316 | 413 | 42 | 1388 | 24.2 |
| SO3 | 1 | | | | | 100 |
| | 2 | | | 10.3 | 243 | 63 |
| | 4 | 288 | 209 | 14.9 | 864 | 43.5 |
| | 5 | 518 | 376 | 26.8 | 1553 | 24.2 |
| SK1 | 1 | | | | | 100 |
| | 2 | | | | 492 | 70.9 |
| | 3 | 92 | 92 | | 776 | 49.5 |
| | 4 | 113 | 129 | | 873 | 56.5 |

Table 2-continued

1 = Total volume, 2 = Mixed volume
3 = Volume of prepared slag clinker,
4 = Volume of cast compound, 5 = Volume of casting.

SURVEY OF PACKING DEGREES, CEMENT NOS. AND BULK DENSITIES

| Cubes No. | Reference No. | Additions Cement (kg) | Water (l) | Water in ballast | Weights by volume in kg/m³ | Volumes |
|---|---|---|---|---|---|---|
| SK2 | 5 | 172 | 197 | | 1334 | 37.0 |
| | 1 | | | | | 100 |
| | 2 | | | 9.5 | 231 | 63 |
| | 3 | 159 | 159 | 14.2 | 687 | 42.3 |
| | 4 | 190 | 89 | | 905 | 41.9 |
| | 5 | 327 | 153 | | 1547 | 24.5 |
| SK3 | 1 | | | | | 100 |
| | 2 | | | 9.5 | 231 | 63 |
| | 3 | 118 | 118 | 14.2 | 600 | 42.3 |
| | 4 | 256 | 128 | 87 | 965 | 45.0 |
| | 5 | 412 | 206 | 140 | 1557 | 27.9 |
| LK2 | 1 | | | | | 100 |
| | 2 | | | | 405 | 88.6 |
| | 4 | 116 | 116 | | 594 | 99.5 |
| | 5 | 137 | 137 | | 701 | 84.3 |
| LK2-2 | 1 | | | | | 100 |
| | 2 | | | | 414 | 91.3 |
| | 4 | 176 | 123 | | 681 | 99.0 |
| | 5 | 213 | 149 | | 827 | 81.5 |
| LK3 | 1 | | | | | 100 |
| | 2 | | | | 395 | 90.9 |
| | 4 | 241 | 110 | | 643 | 123.5 |
| | 5 | 369 | 169 | | 982 | 80.8 |

Table 3

SUMMARY OF OBTAINED DATA

| Cube series No. | Manufacturing date | Compression strength in kp/cm² | | Bulk density in kg/dm³ | | Water absorption in % by volume/m³ | | Water absorption in % by weight/m³ | | Remarks |
|---|---|---|---|---|---|---|---|---|---|---|
| | Date | 8 days | 28 days | 8 days | 28 days | 8 days | 28 days | 8 days | 28 days | |
| SO1 | 17.11.69 | 38 | 72 | 1.44 | 1.28 | 4.0 % | 13.0 % | 2.8 % | 10.2 % | |
| SO2 | 19.11.69 | 150 | 213 | 1.67 | 1.63 | 1.6 % | 5.3 % | 0.95 % | 3.0 % | |
| SO2-2 | 25.11.69 | 22 | 41 | 1.28 | 1.06 | 2.4 % | 21.0 % | 1.9 % | 19.8 % | |
| SO3 | 27.11.69 | 110 | 130 | 1.42 | 1.35 | 3.8 % | 6.8 % | 2.7 % | 5.0 % | |
| SK1 | 21.11.69 | (22) | (85) | 1.37 | 1.26 | 7.4 % | 16.3 % | 5.4 % | 12.9 % | high-void (cavitetic) |
| SK2 | 28.11.69 | 120 | 160 | 1.51 | 1.46 | 2.5 % | 5.1 % | 1.7 % | 3.0 % | |
| SK3 | 5.12.69 | 110 | 146 | 1.49 | 1.45 | 2.2 % | 5.8 % | 1.5 % | 4.0 % | |
| LK2 | 2.12.69 | (25) | (42) | 0.73 | 0.72 | 7.7 % | 7.3 % | 10.5 % | 10.1 % | |
| LK2-2 | 8.12.69 | 48 | 47 | 0.78 | 0.74 | 7.0 % | 7.7 % | 9.0 % | 10.4 % | |
| LK3 | 3.12.69 | 90 | 100 | 0.98 | 0.99 | 3.5 % | 3.4 % | 3.6 % | 3.4 % | |
| Ytong | Bought | — | (40) | — | 0.56 | — | 23.5 % | — | 41.9 % | |
| Siporex | Bought | — | (45) | — | 0.50 | — | 26.5 % | — | 53.0 % | |

Water absorption in the materials as ballast:
Untreated slag in the fractions 0–20 equal parts 24 h 135 % by weight
Slag clinker in the fractions 0–20 equal parts 24 h 13 % by weight
Expanded clay clinker in the fractions 0–20 equal parts 24 h 28 % by weight.

At SK1 a four-fold increase of the compression strength is obtained as determined after 28 days in comparison with after 8 days. Very big cavities (voids) are obtained in the test cube. SK2 gives a better result than SK3, in spite of the fact that the cement number (the K-number) is bigger in the latter product.

After 6 months the compression strength is unchanged at the cubes with clinker prepared by treatment of pumiced slag with the present liquid composition, whereas it has been reduced by 25 % at the cubes containing clinker of untreated, pumiced slag.

Examination shows that neither heat nor cold influences compression strength.

If the different fractions of untreated, pumiced slag are immersed for 24 h in water, the fraction 0–5 mm will absorb 155 per cent by weight, the fraction 5–10 mm 140 per cent by weight and the fraction 10–20 mm 120 per cent by weight. After 5 days an average value of 200 per cent by weight is obtained. It appears from table 3 that slag clinker, expanded clay clinker, Ytong and Siporex (the light weight concrete materials Ytong and Siporex are prepared by fermentation of a special concrete compound with aluminum powder) absorb 13, 28, 41.9 and 53.0 Per cent by weight respectively.

It is apparent from the tables that the clinker prepared according to the indicated method is fully equal to known ballast materials. It has a high conversion strength and a low water absorption. Sulphur present in the porous waste material is enclosed by the solid crust surrounding the clinker grains more or less hermetically and water-tight, and therefore no corrosion due to the sulphur will occur. Nor can lime present in the mineral material influence the cement in the concrete.

Slag having a bulk density of 300–800 kg/m³ is not crushed in the mixer in the manner indicated in the example, and therefore it is crushed to the fractions 0–4, 4–8 and 8–16 mm before the addition of liquid.

By clinker prepared according to the indicated method a light-weight clinker concrete can be made, which is heavier and tighter than light concrete, is homogeneous and has a greater compression strength and less water absorption and is sound- and heat-insulating.

There is a great advantage with the concrete that can be prepared from clinker treated with the present liquid composition, viz. the surfaces of the prepared unit are smooth and tight. Lightweight concrete as well as concrete of expanded clay clinker must be dressed after mounting, which is both time-comsuming and expensive.

EXAMPLE 2.

Main mixtures are prepared according to the following:
1. 0.5 l Vinakryl 2468 is mixed with 0.5 l water; (Vinakryl 2468 is the trademark of an emulsion of a styrene-acrylate copolymer.)
2. 2.2 kg Glauber's salt is dissolved in 10 l water;
3. 2 kg sodium acetate is dissolved in 10 l water;
4. 250 g aluminum fluoride is dissolved in 15 l water;
5. 2 kg sodium thiosulfate is dissolved in 10 l water;
6. water glass of the concentration 40–42 Be is prepared.

For the preparation of a liquid composition according to the present invention the following is mixed from these main mixtures:

|        |     |                |
|--------|-----|----------------|
|        | 1   | l of mixture 1) |
|        | 1   | l of mixture 2) |
|        | 0.5 | l of mixture 3) |
|        | 0.5 | l of mixture 4) |
|        | 0.5 | l of mixture 5) |
|        | 3.5 | l of mixture 6) |
| Totally | 7.0 | l              |

EXAMPLE 3

A liquid for the preparation of clinker is mixed from the main mixtures according to example 2. 1 l Vinakryl 2468-solution (main mixture 1) is mixed with 0.5 l sodium acetate solution (main mixture 3), 0.5 l aluminum fluoride solution (main mixture 4) and 3.5 l water glass (main mixture 6). Then 1 dl of perchloric acid of 20 per cent is added to 5 l liquid mixture. Pumiced slag of the fractions 10–20 mm, 5–10 mm and 0–5 mm of the weight 680, 720 and 930 kg/m³ is introduced into a dough mixer as in example 1, and 5 l of the above liquid mixture are added per 100 l slag. After tumbling for 15 min at 80°–90°C test cubes of the treated as well as the untreated pumiced slag are cast. The concrete is made high-void, not water-tight. Reinforcement bars φ 6 Ks 40 are placed in the cubes. Both the series are cast, sprinkled and air-dried under the same conditions. After 28 days 3 cubes of each series are tested. It is found that the three untreated cubes have a compression strength of 90–110 kg/cm² and the armouring is attached by corrosion. The three cubes treated have a compression strength of 130–160 kg/cm³ and the armouring is free of rust.

The examination of the water absorption of the untreated and treated cubes shows that about 10 per cent by weight of water are absorbed by the untreated cubes and 5 per cent by weight by the treated ones.

The test shows that corrosion is eliminated, the compression strength is increased and the water absorption is reduced by treatment of the pumiced slag with the liquid composition of the present invention.

EXAMPLE 4

For examination of the water absorption of a treated slag untreated, pumiced slag is immersed in water. After 24 h it has absorbed 13 per cent by weight of water and after 7 days 17 per cent by weight. Pumiced slag treated with the liquid of the present invention and example 2 is immersed in water in the same way. After 24 h it has absorbed 3.5 per cent by weight of water and after 7 days 5.3 per cent by weight.

Then the slag is treated with 15–20 % of an asphalt solution, wherein asphalt A 120 and white spirit have been mixed in the ratio 70:30. After coating with asphalt the slag particles do not absorb any water.

EXAMPLE 5

Spruce bark containing about 35 % of water is mixed with a liquid composition according to the present invention and example 2. The bark is torn, after which it is introduced into an oven and tumbled at 90°C, until it is dry. Then it is treated with 1.5–2 dl asphalt per m³ at a temperature of 100°–110°C. The water absorption is determined for bark treated merely with the present liquid and bark treated with the present liquid and asphalt. It has not been possible to prove any water absorption, whether the bark is only treated with liquid according to the invention or it is also treated with asphalt.

A sediment from a paper mill containing torn wood mixed with kaolin is pressed so that the main part of the water is removed. Then the sediment is treated in substantially the same way as the bark. An analogous result is obtained.

EXAMPLE 6

The liquid mixture of example 2, wherein however the amount of water glass and aluminum fluoride has been doubled, is diluted with water in the volume ratio 1 part liquid to 29 parts water. Bark of spruce and pine, which is fresh, i.e. newly barked, is mixed with the diluted liquid in a dough mixer according to example 1. Then the bark is tumbled at 90°–100°C for 5–10 min so that complete penetration of the liquid takes place. The bark is tumbled under drying at 100°–120°C for about 15 min. After drying an asphalt solution of 120°C dissolved in like parts of white spirit is sprayed on the bark under stirring. Stirring is continued until cooling, after which the bark is ready for use as a road-filling material.

EXAMPLE 7

Sediment from the cellulose industry is treated in a manner analogous to the bark in example 6. The sediment contains about 30 % water, when it comes out from the mill after pressing. This sediment is suitable for treatment with the present liquid composition, pellets of different size being formed during the tumbling. On the other hand, if the sediment is dried so that less than 30 % water are present in the sediment, water must be added so that at least 30 % water is present inclusive of the water in the liquid. Otherwise the sediment will decompose only the fraction 2–5 mm, which is of no interest. Tumbling should take place rapidly for about 3–5 min, after which the sediment is dried for about 15–20 min. Tumbling and stirring is continued under addition of asphalt in the form of asphalt solution of 120° in like parts of white spirit. The sediment pellets can then be fractionated to different sizes in the same way as gravel is sieved.

EXAMPLE 8

Garbage containing paper, cardboard, plastic, plastic-coated wrapping, wood, textiles, plate, glass, topsoil and food scraps is ground in a disposer. Small flakes, where the biggest fraction is about 3 × 3 cm, are obtained from paper and plastics. Other constituents of the garbage, such as food scraps, wood, glass, fabric, peels of different kinds, etc. become small chips and pulp. Water and/or slurries of chemical waste products, such as sludge, sedimented waste from factories etc. are added to the first mixer of a tumbling machine, until a slurry is obtained. Then about 10 l liquid prepared from the main mixture according to example 2 are added per m³ (loosely packed volume) of waste in the following way:

| | | Mixture |
|---|---|---|
| Mixture 1. | 1.5 l Vinakryl + 1.5 l water | |
| Mixture 2. | 2.2 kg Glauber's salt + 10 l water | 1.0 l |
| Mixture 3. | 2.0 kg sodium acetate + 10 l water | 0.5 l |
| Mixture 4. | 250 g aluminum fluoride + 15 l water | 0.5 l |
| Mixture 5. | 2 kg sodium thiosulfate 10 l water | 1.0 l |
| Mixture 6. | 4 l water glass conc. 40–42 Be | 4.0 l |
| | | 10.0 l |

Then the pulp is tumbled in the rotating drum, in whose upper portion knives are placed grinding the pulp. The disintegrated pieces are rolled to the wall of the drum during the tumbling, so that pellets are obtained, which dry, as the drum wall is hot. The length of the drum used is 25 m, and therefore the pellets are quite dry, when they leave the drum. In another mixer asphalt solution is spread over the pellets in stirring, after which the pellets are tumbled in a shorter, heated drum so that they are dry when they leave the latter. The material is now ready for use as heat-insulating road building or filling material or for storage. By using more diluted asphalt solution and a less amount thereof the material will be suitable as ballast in lightweight and insulating concrete. Cubes cast from the material to so-called high-void concrete and with a cement content of 300 kg/m³ have the compression strength 42 kg/cm², which result is better than the results obtained for comparable materials.

EXAMPLE 9

A material consisting of bark, sediment and garbage treated with the present liquid composition was placed in drinking-water for 24 h, then at −30°C in a freezer for 24 h and then at +50°C in a heating chamber for 24 h. This was repeated seven times. Parallelly to this the material was tested by exposing to an ultraviolet lamp for 30 min per 24 h or with a radium lamp for 30 min, and also to IR-radiation for 30 min. was found that the material was not damaged at all by this, which was controlled in respect of water absorption and compression strength.

A leaching test was carried out in such a way that the material was immersed in distilled water for one month with ther result that a pH of 9.5 could be measured.

EXAMPLE 10

For the preparation of a fire-retarding liquid kaolin in an amount of 4 parts by volume of kaolin per 10 parts by volume of liquid mixture is added to the liquid mixture according to example 2. This fire-retarding liquid is suitable for treatment of wet fibreboard. If, on the other hand, the fibreboards are dry, the liquid is diluted with another 3 parts by volume of water, so that penetration of the dry material is obtained. The amount of added liquid should be increased so that an equal amount of dry substance is obtained.

For impregnation of walls and ceilings in a house a fire-retarding liquid is used obtained in such a manner that the liquid mixture according to example 2 is diluted with 3 l water, after which 1 l kaolin is added.

If the fibreboard to be treated is papered, the paper is removed, after which the board is treated with additionally diluted fire-retarding liquid, great swelling possibly taking place. The board sheets are treated with 1 l fire-retarding liquid per m² sheet. A less amount of fire-retarding liquid is necessary if a less diluted mixture is used. Thus, for perfectly satisfactory fire protection 0.6 l mixture according to example 2, to which 4 l kaolin per m² wet sheet have been added, will suffice. An examination shows however, that less than 0.5 l/m² of the latter liquid does not provide a perfectly satisfactory protection as cracks are formed in the heat shield.

EXAMPLE 11

The fire-retarding liquid of example 10, where 4 l kaolin is used per 10 l liquid mixture as in example 2, is applied to sheets of finished board in the process line in an amount of 1 l/m². Fire test shows that an ignition protection of British class I and Swedish class 2 is obtained.

A semi-hard, dry fibreboard coated with 1 l/m² of the fire-retarding liquid indicated above follows the asbestos curve (curve 0) for 1.5 min. Then a top value almost towards curve 2 is obtained, after which curve 1 is approached.

EXAMPLE 12

For examination of the present fire-retarding liquid fire tests were carried out on particle boards of different qualities. Test samples of the boards were immersed in or painted with the fire-retarding liquid. With a blowlamp applied directly to the board the time for the flame to penetrate the board was determined by means of a stop watch.

It took 13.5 min for the flame to penetrate 13 mm thick board. When the lamp was removed from the board, the fire went out immediately. Thus the boards are not destroyed by fire. Tests also show that 13 min of intensive flame against a particle board are required in order that the flame should burn through the board. The fire will go out directly when the flame is removed.

EXAMPLE 13

Fire tests were carried out on 60 × 60 cm boxes of board prepared with the fire-retarding liquid of the invention. The box had one side open. 1 kg cutter shavings soaked with white spirit was placed in the boxes and set on fire. The cutter shavings burnt heavily, the flames flaring up through the open side. The fire continued for 10 min until the shavings were burnt. Then the fire went out. The box was burnt on the inside, but on the outside nothing could be seen neither on walls nor on roof.

EXAMPLE 14

A piece of wallpaper coated with the present liquid composition was set on fire. It starts to burn after a few moments, but the fire goes out quickly. On the paper a steel-grey, strong film with the wallpaper pattern maintained has been formed in addition to a smut, and a heat shield has been developed. This cannot be set on fire any more.

This heat shield could also be observed at porous board coated with the liquid as well as at a papered board. No ignition takes place.

EXAMPLE 15

Ordinary typing-paper is immersed twice in a liquid mixture according to example 2 diluted with 3 l water. The paper becomes stiff but not brittle. It gets the appearance of old yellowed paper and obtains fire-retarding properties. Immersion once in a thicker liquid gives an unnecessarily stiff paper.

The liquid can in the same way provide textile materials with fire-retarding properties, but the material becomes stiff.

EXAMPLE 16

A fire extinguisher liquid is prepared from the liquid mixture of example 2, in which however the amount of water glass and aluminum fluoride has been doubled, by adding 4 l crushed pumiced slag fines to 10 l diluted liquid containing 1 part of liquid to 5–15 parts of water. The examination shows that this liquid extinguishes genuine so-called wood fires, eliminates reignition and has a certain effect on genuine petroleum fires.

EXAMPLE 17

Pumice and expanded clay clinker are treated with a liquid composition according to the present invention as in the method described in example 1 and are combined with a suitable plastic. One can prepare facing plates from the material obained, which appear to be very resistant to different surrounding conditions and insensitive to fire.

I claim:

1. A liquid composition suitable for the treatment of waste materials, comprising in parts by volume:
   a. 1 part of a mixture of 1 part by volume of a plastic in 0 to 10 parts by volume of water, wherein the plastic is polyvinylacetate, polyvinyl acrylate, polyvinyl chloride, polystyrene or copolymers of two or more of said plastics,
   b. 1 part of a solution of 0.5 to 3 parts by weight of an alkali metal sulfate in 1 to 10 parts by weight of water,
   c. 0.5 to 1 part of a solution of 1 part by weight of an alkali metal acetate in 4 to 20 parts by volume of water,
   d. 0.5 to 1 part of a solution of 0.25 parts by weight of an aluminum compound selected from aluminum fluoride, aluminum fluorosilicate, and alum in 10 to 40 parts by volume of water,
   e. 0.5 to 1 part of a solution of 0.5 to 3 parts by weight of an alkali metal thiosulfate in 1 to 10 parts by volume of water.
   f. 3 to 5 parts of water glass of 38–42 Be,
   g. 0 to 10 parts of finely divided kaolin, and
   h. 0 to 10 parts of crushed pumice slag,
in which, if desired, 1 part by volume of 6–60% perchloric acid may be added to 50 parts by volume of parts (a), (c), (d) and (f) in place of parts (b) and (e).

2. A composition according to claim 1 wherein the water glass is 40–42 Be.

3. A composition according to claim 2 wherein the aluminum compound is aluminum fluoride.

4. A composition according to claim 3 wherein the alkali metal is sodium.

5. A composition according to claim 4 wherein the plastic is a styrene-acrylate copolymer.

6. A composition according to claim 1 wherein a saturated solution of alum is present in place of the perchloric acid.

* * * * *